US012804575B2

(12) United States Patent
Cao et al.

(10) Patent No.: US 12,804,575 B2
(45) Date of Patent: Nov. 17, 2026

(54) UL TX SWITCHING FOR CARRIERS HAVING DIFFERENT TAGS

(71) Applicant: QUALCOMM Incorporated, San Diego, CA (US)

(72) Inventors: Yiqing Cao, Beijing (CN); Timo Ville Vintola, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 18/693,134

(22) PCT Filed: Nov. 12, 2021

(86) PCT No.: PCT/CN2021/130224
§ 371 (c)(1),
(2) Date: Mar. 18, 2024

(87) PCT Pub. No.: WO2023/082163
PCT Pub. Date: May 19, 2023

(65) Prior Publication Data
US 2024/0292360 A1 Aug. 29, 2024

(51) Int. Cl.
*H04W 56/00* (2009.01)
*H04W 8/22* (2009.01)
*H04W 76/20* (2018.01)

(52) U.S. Cl.
CPC ......... *H04W 56/0045* (2013.01); *H04W 8/22* (2013.01); *H04W 76/20* (2018.02)

(58) Field of Classification Search
CPC ............... H04W 56/0045; H04W 8/22; H04W 76/20; H04W 28/0215; H04W 36/0072;
(Continued)

(56) References Cited

U.S. PATENT DOCUMENTS

2015/0036666 A1 2/2015 Blankenship et al.
2017/0332370 A1 11/2017 Rico Alvarino et al.
(Continued)

FOREIGN PATENT DOCUMENTS

EP 3429307 A1 1/2019
WO 2014028908 A1 2/2014
(Continued)

OTHER PUBLICATIONS

ERICSSON: "Extending the Deployment Scenarios for UE TX Switching", TSG-RAN Working Group 4 (Radio) meeting #101-e, R4-2118123, 3rd Generation Partnership Project, Mobile Competence Centre, 650, Route Des Lucioles, F-06921 Sophia-Antipolis Cedex, France, vol. RAN WG4, No. Electronic meeting, Nov. 1, 2021-Nov. 12, 2021, Oct. 22, 2021, XP052069584, 7 Pages. Observations 2 and 3 (p. 4), Fig. 1 (p. 2).
(Continued)

*Primary Examiner* — Edan Orgad
*Assistant Examiner* — Samuel Roberge Bettendorf
(74) *Attorney, Agent, or Firm* — Procopio, Cory, Hargreaves & Savitch LLP

(57) ABSTRACT

A UE transmits UE capability information to a first base station on a first carrier. The UE capability information is associated with a CA switching period for a second carrier or is indicating a set of bands associated with CA bands of at least the second carrier. The first and second carriers belong to different TAGs. The UE switches from communicating on the first carrier associated with a first TA of a first TAG to communicating on the second carrier associated with a second TA of a second TAG. The first TAG is different from the second TAG. The first TA is greater than the second TA. The second carrier is associated with the CA switching period or the set of bands associated with the CA bands. The
(Continued)

UE communicates with a second base station on the second carrier based on the transmitted UE capability information.

30 Claims, 7 Drawing Sheets

(58) Field of Classification Search
CPC .................. H04W 40/02; H04W 8/24; H04W 36/00692; H04W 72/51; H04L 5/001; H04L 5/0098
See application file for complete search history.

(56) References Cited

U.S. PATENT DOCUMENTS

2018/0098358 A1* 4/2018 Rico Alvarino ........ H04L 5/001
2019/0044678 A1* 2/2019 Liu ....................... H04L 27/261
2019/0313356 A1 10/2019 Sandgren et al.
2020/0259618 A1* 8/2020 Yang ................. H04W 72/0453
2020/0374826 A1* 11/2020 Zhang .................. H04L 5/1469
2021/0266223 A1* 8/2021 Zhang .................. H04L 1/1812

FOREIGN PATENT DOCUMENTS

WO 2021208052 A1 10/2021
WO WO-2022161051 A1 * 8/2022 ........ H04W 72/0453

OTHER PUBLICATIONS

Supplementary European Search Report—EP21963615—Search Authority—MUNICH—May 20, 2025.
Ericsson: "TX Switching for Non-Collocated UL CA", TSG-RAN Working Group 4 (Radio) meeting #99-e, R4-2109977, No. Electronic meeting, May 19, 2021-May 27, 2021, 6 Pages, May 12, 2021, Section 3 and 4.
International Search Report and Written Opinion—PCT/CN2021/130224—ISA/CN—Aug. 3, 2022.

* cited by examiner

UL TX SWITCHING FOR CARRIERS HAVING DIFFERENT TAGS

CROSS REFERENCE TO RELATED APPLICATIONS

This application is a National Stage Application filed under 35 U.S.C. § 371 of PCT International Application Serial No. PCT/CN2021/130224 entitled "UL TX SWITCHING FOR CARRIERS HAVING DIFFERENT TAGS" and filed on Nov. 12, 2021, which is expressly incorporated by reference herein in its entirety.

TECHNICAL FIELD

The present disclosure relates generally to communication systems, and more particularly, to adjustment of transmission timing between multiple base stations having different timing advance groups (TAG) from one another.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When a UE switches from communicating on a first carrier to communicating on a second carrier, determining an appropriate switching period is a trivial matter when both carriers belong to the same TAG. However, determining an appropriate switching period is more complex when both carriers do not belong to the same TAG.

To solve this issue, a UE may be configured to transmit, to a first base station on a first carrier, UE capability information. The UE capability information may be information associated with a carrier aggregation (CA) switching period for a second carrier or information indicating a set of bands associated with CA bands of at least the second carrier. The first carrier and the second carrier may belong to different TAGs. The UE may switch from communicating on the first carrier associated with a first timing advance (TA) of a first TAG to communicating on the second carrier associated with a second TA of a second TAG. The first TAG and the second TAG may be different. The first TA may be greater than the second TA. The second carrier may be associated with the information associated with the CA switching period for the second carrier or with the information indicating the set of bands associated with the CA bands of at least the second carrier. The UE may communicate with a second base station on the second carrier based on the transmitted UE capability information.

To the accomplishment of the foregoing and related ends, the one or more aspects may include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
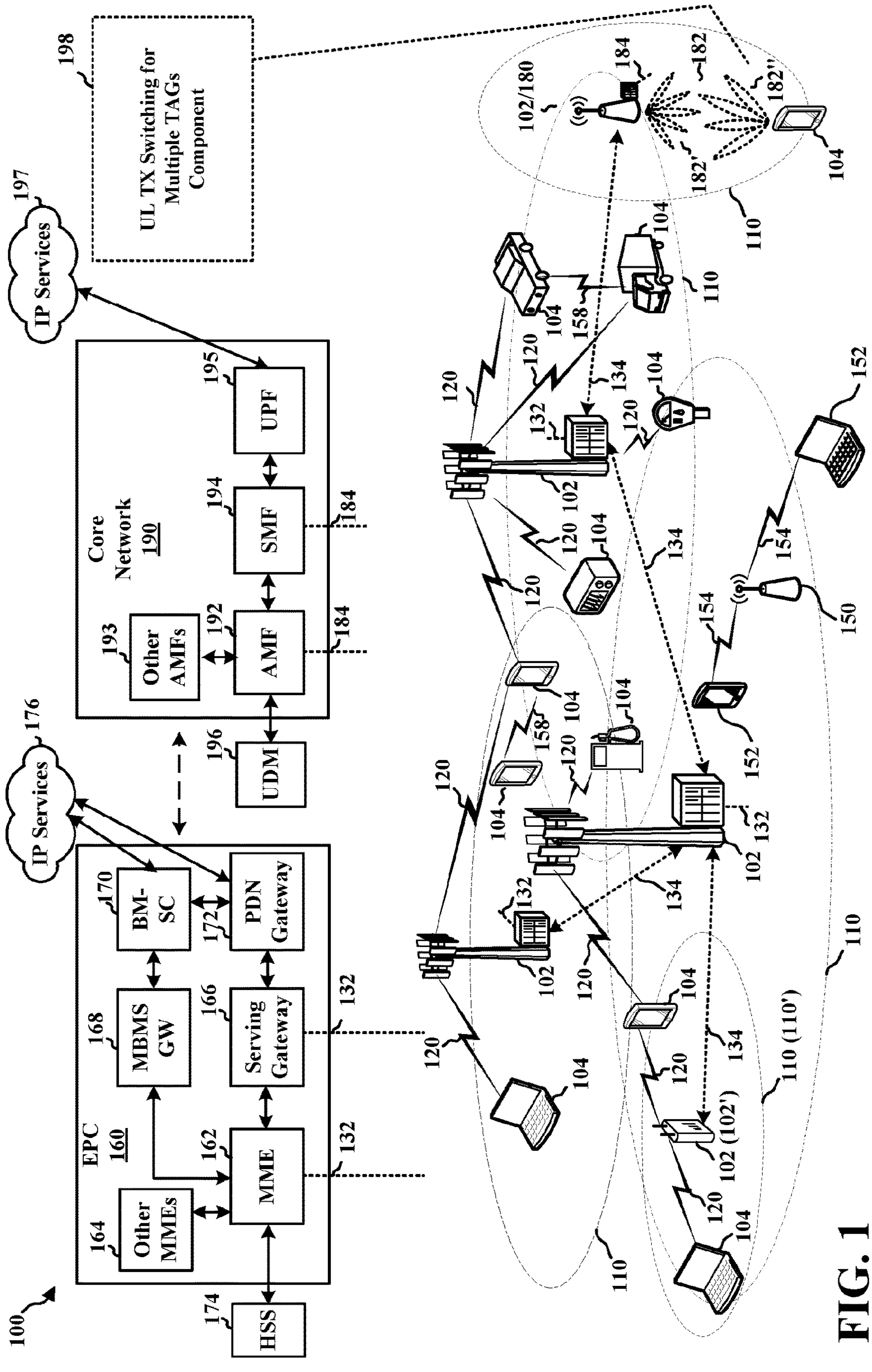
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers (CCs) may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a UL transmission (TX) channel switching for multiple TAGs component 198 configured to perform UL TX channel switching between base stations 102 on CCs with different TAGs. Although the following description may be focused on UEs switching between two CCs, the concepts described herein may be applicable to a UE that switches between three, four, or more CCs, some of which may transmit and receive data on CCs having different TAGs.

Figure 2B:
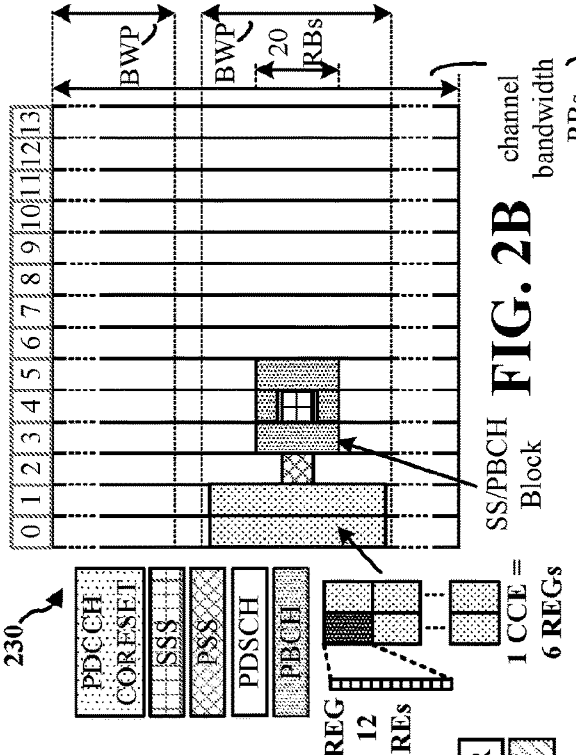
FIG. 2B is a diagram illustrating an example of DL channels within a subframe, in accordance with various aspects of the present disclosure.
Figure 2D:
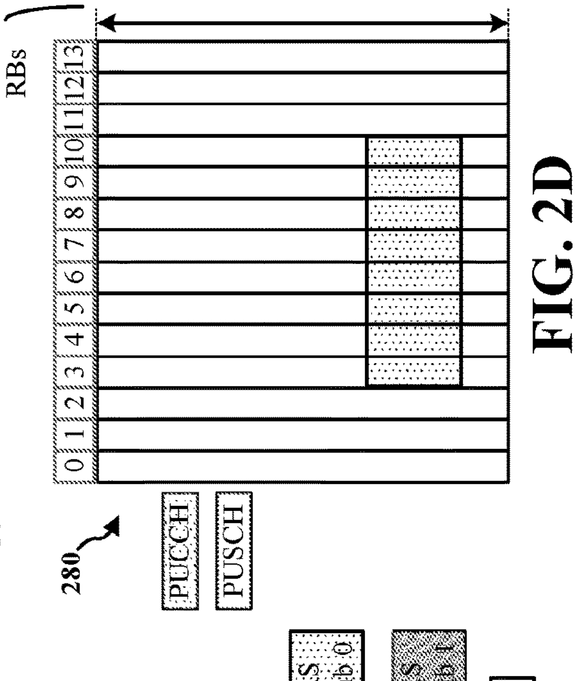
FIG. 2D is a diagram illustrating an example of UL channels within a subframe, in accordance with various aspects of the present disclosure.
Figure 2A:
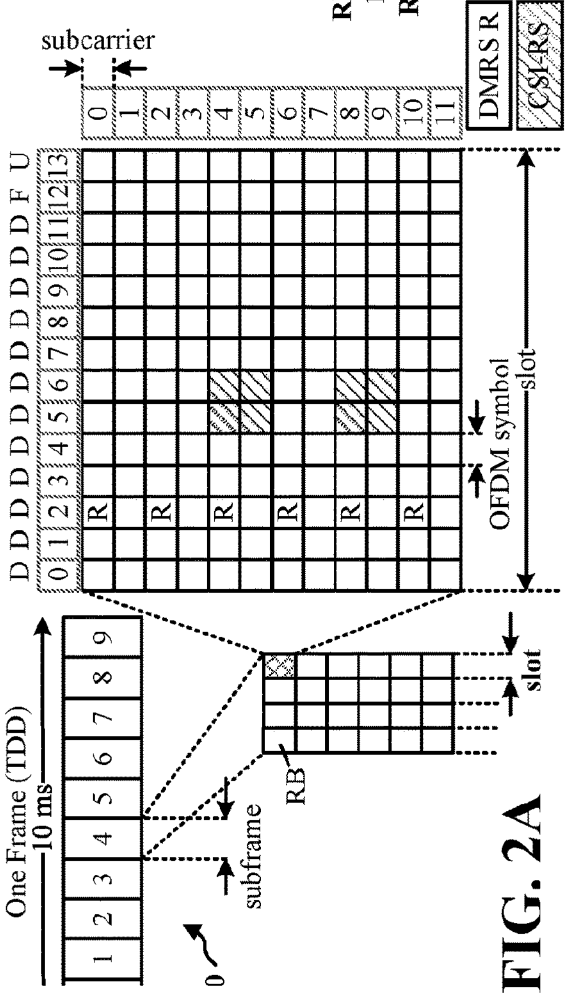
FIG. 2A is a diagram illustrating an example of a first frame, in accordance with various aspects of the present disclosure.
Figure 2C:
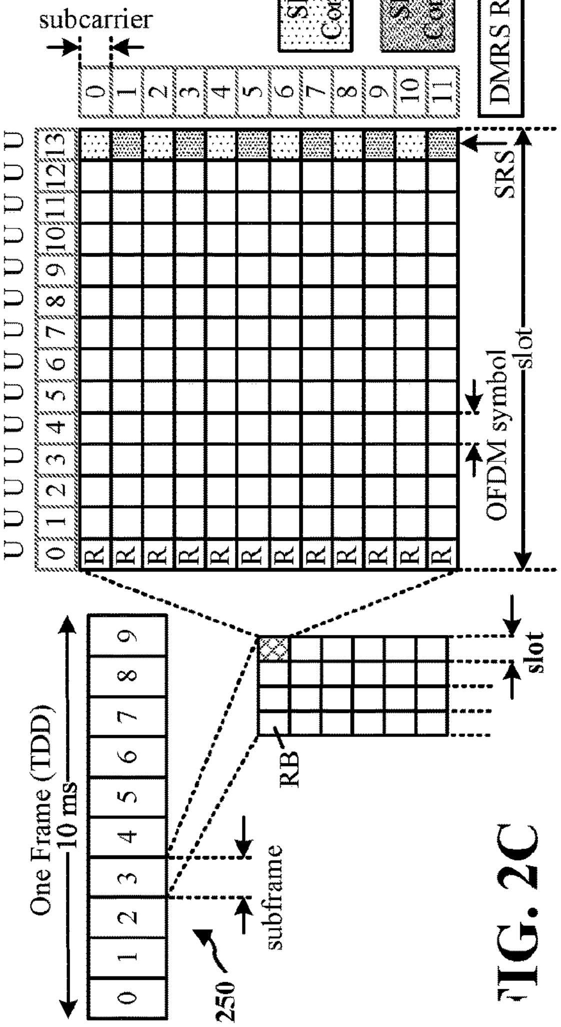
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |

-continued

| μ | SCS $\Delta f = 2^{\mu} \cdot 15$[kHz] | Cyclic prefix |
|---|---|---|
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to $2^{\mu}$*15 kHz, where y is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
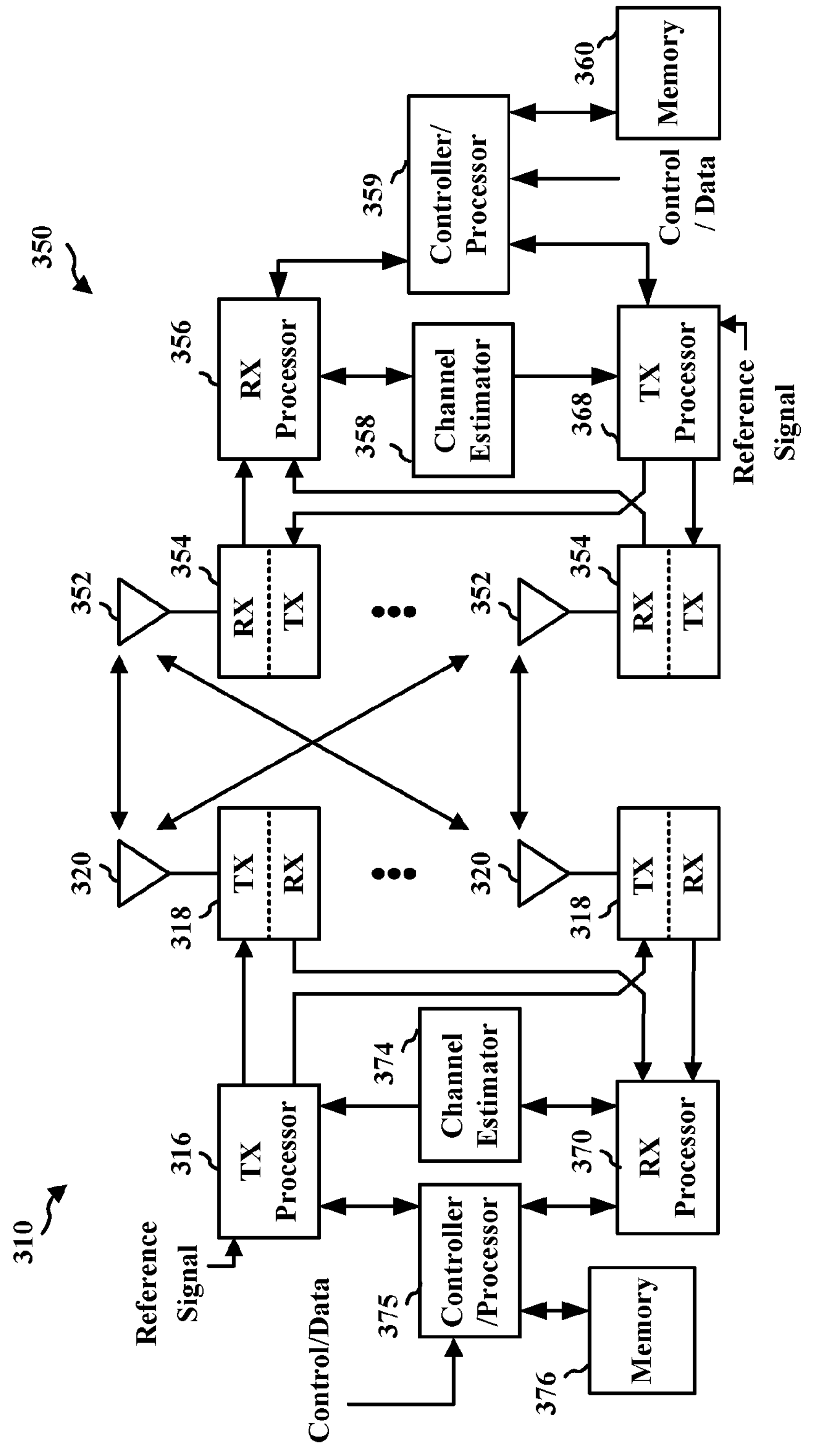
FIG. 3 is a diagram illustrating an example of a base station UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UE 198 of FIG. 1.

A UE 104 may be configured to allow UL TX switching to occur between carriers or bands belonging to the same TAG and to not allow UL TX switching to occur between carriers or bands that do not belong the same TAG. For example, where a UE 104 switches between two carriers within the same TAG (i.e., each carrier has the same TA), the UE may wait for a switching period of 2*TA between concluding its UL TX transmission on the first carrier and starting its UL TX transmission on the second carrier. Specifically, when a UE switches from transmitting on a first carrier to transmitting on a second carrier, where both carriers belong to the same TAG having TA=35 μs, the UE may be configured to wait for 70 μs (i.e., 2*TA) between finishing its UL TX data transmission on the first carrier and starting its UL TX data transmission on the second carrier. When a UE switches from transmitting on a first carrier to transmitting on a second carrier, where both carriers belong to the same TAG having TA=140 μs, the UE may be configured to wait for 280 μs (i.e., 2*TA) between finishing its UL TX data transmission on the first carrier and starting its UL TX data transmission on the second carrier.

Figure 4:
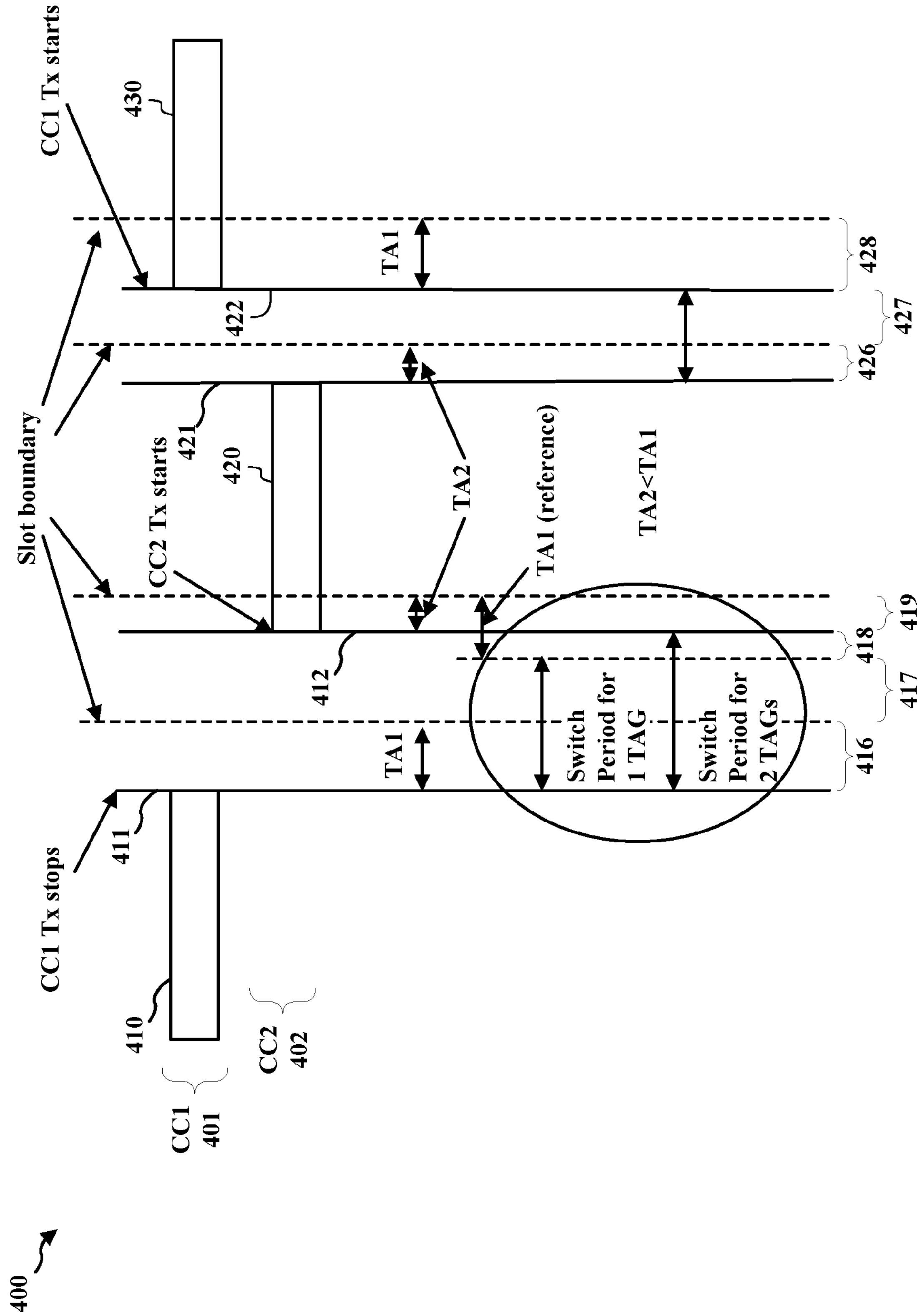
FIG. 4 is a diagram illustrating an example of various timing advance CA switching periods for a UE transmitting data on a first carrier, then on a second carrier, and then back on the first carrier.

FIG. 4 shows a diagram 400 illustrating an example of how a TA switch period may change for a UE when the UE switches between carriers belonging to a single TAG to carriers that belong to different TAGs. In other words, the TA switch period used by a UE may change when the UE transmits on a first carrier CC1 401 having a switch period of TA1 and then switches to transmit on a second carrier CC2 402 having a switch period of TA2, where TA1 does not equal TA2. A switch period or a switch gap may also be known as a guard period (GP), which may designate a time between a transmission to a first carrier and a transmission to a second carrier to avoid interference by compensating for propagation delays. A TA may represent a time when a transmitted signal is received by a CC. For example, when the UE stops transmitting the data 410 on CC1 401 at the time 411, CC1 may receive the last portion of the data 410 after the time delay 416 (i.e., TA1). When the UE starts transmitting the data 420 on CC2 402 at time 412, CC2 may receive the first portion of the data 420 after the time delay 419 (i.e., TA2).

As shown in FIG. 4, a UE may be configured to first transmit data 410 on a CC1 401 associated with a TA of TA1, then to transmit data 420 on a CC2 402 associated with a TA of TA2, and then to transmit data 430 on the CC1 401 associated with the same TA of TA1. Here, the UE stops transmitting data 410 at time 411, and then switches to a different CC to transmit data.

If the UE were to transmit the data 410 to another CC that belongs to the same TAG, then the UE may use the switch period for 1 TAG, shown by adding the time delay 416 to the time delay 417 in the diagram 400. The switch period for 1 TAG may be calculated simply as double the TA for the UE when transmitting data on the carrier. Here, for CC1 401, the UE may wait for 2*TA1 before transmitting data to the other CC that belongs to the same TAG. In other words, after the UE stops transmitting the data 410 at time 411, the UE may wait for a time delay of 416 (i.e., TA1), and for a time delay of 417 (i.e., another TA1) before transmitting data to the other CC that belongs to the same TAG.

However, here, the UE may use the switch period for 2 TAGs, shown by adding the time delay 418 to the time delay 416 and 417. The switch period for 2 TAGs may be calculated as adding the difference between the TAGs to double the TA for the UE when transmitting data on the carrier when the TA for the first carrier is greater than the TA for the second carrier. In other words, the switch period for 1 TAG may be increased by |TA1−TA2| to a switch period for 2 TAGs. Such switches may occur when a UE first transmits on a carrier associated with a larger TA (e.g., CC1 having a TA of TA1) and then transmits on a carrier associated with a smaller TA (e.g., CC2 having a TA of TA2). Specifically, after the UE stops transmitting the data 410 on CC1 at time 411, the UE may wait for a time delay of 416 (i.e., TA1), then for a time delay of 417 (i.e., another TA1), and finally for a time delay of 418 (i.e., TA1-TA2) before transmitting the data 420 on CC2 at time 412. Preferably, both the UE and the base station are configured to wait for the switch period for 2 TAGs with respect to communicating with one another, to prevent any data or transmissions from being lost or ignored by a device.

The UE may stop transmitting the data 420 at time 421, at which point the UE may then switch to a different CC to transmit data. Again, a calculation may be made to determine how long the UE needs to wait before transmitting data to the other CC. Here, the UE is switching from transmitting data on CC2 to transmitting data on CCL. Since the UE is switching from transmitting data on a CC that has a smaller TA (i.e., CC2 has a TA of TA2) to transmitting data on a CC that has a larger TA (i.e., CC1 has a TA of TA1), the UE may use the larger TA1 as a reference to calculate the switch period without taking the smaller TA2 into consideration. In other words, after the UE stops transmitting the data 420 at time 421, the UE may wait for a time delay of 426 (i.e., TA2) followed by a time delay of 427 (i.e., TA2) before transmitting to CC1 the data 430 at time 422, which is then received by CC1 401 after a time delay of 428 (i.e., TA1).

In order to achieve the appropriate timing calculation, the UE may be configured to have the capability to dynamically change its switching gap. The UE may be configured to have added capability for non-collocated CA UL TX switching (i.e., per band per band combination), to allow for a larger switching gap to be used when needed. The larger switching gap may be achieved in any suitable manner, for example the UE may calculate and report the larger switching gap to the base station(s) of CC1 and CC2, or the network (i.e., a base station(s) communicating with the UE) may configure the larger switching gap for the UE. Network configuration may be based upon data received from the UE (e.g., UE capability information) or based upon data received from another base station. While FIG. 4 may illustrate a UE that only transmits data on two CCs, a UE may be configured to transmit data using any number of CCs, such as three, four, five, six, or more CCs.

Figure 5:
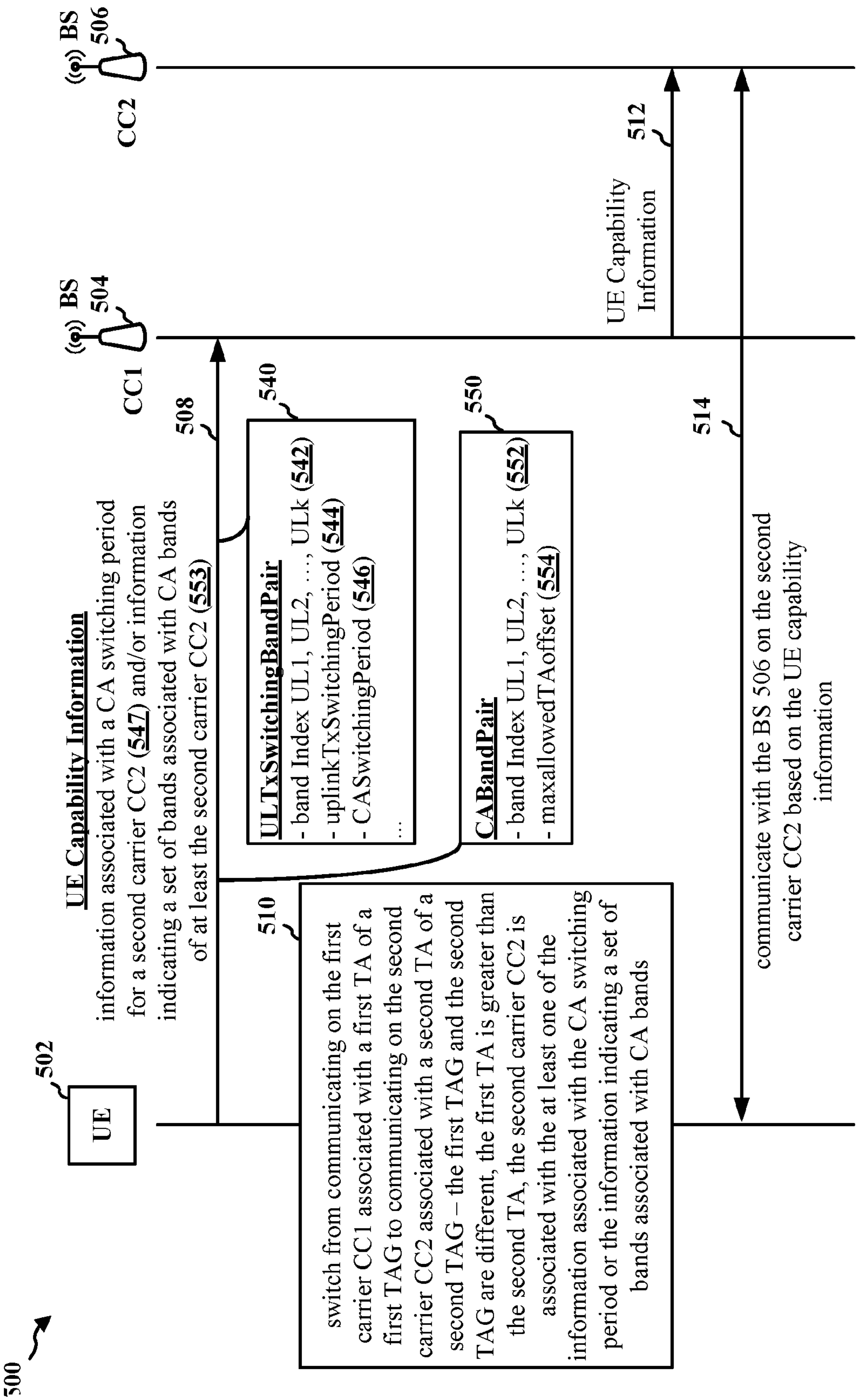
FIG. 5 is a call flow diagram illustrating an example of data that may be transferred between a UE and two base stations.

FIG. 5 shows a call flow diagram 500 that illustrates examples of UE capability information 508 that may be transmitted to a base station (BS) 504. The UE capability information 508 may be used by a device (e.g. UE 502, BS 504, BS 506) to dynamically change the switch period for the UE 502. The added configuration may reuse current UE capability structure and expand the current UE capability structure to cover non-collocated CA for UL TX switching, or may add new UE capability structures to provide the added UE capability information.

The UE 502 may be configured to transmit UE capability information 508 to the first BS 504. The UE 502 may then communicate with the second BS 506 based on the transmitted UE capability information 508. While two base stations (BS 504 and BS 506) with two CCs (CC1 and CC2) are shown in FIG. 5, UE 502 may be configured to transmit uplink data to more than just two CCs, and/or may be configured to transmit uplink data to more than just two base stations.

The UE 502 may be configured to transmit UE capability information 508 to the base station 504. The UE capability information 508 may include, for example, information associated with a CA switching period for a second carrier CC2 547, such as a length of the TA for BS 506 or the length of a GP for BS 506. The UE capability information 508 may also or may alternatively include information indicating a set of bands associated with one or more CA bands of at least the second carrier CC2 553. For example, the UE may be configured to transmit an identifier of each band for BS 506, and/or any associated CCs of BS 506.

The UE 502 may provide the UE capability information 508 as a set of values for one or more of the parameters or variables for a ULTxSwitchingBandPair structure 540. The ULTxSwitchingBandPair structure 540 may indicate that the UE 502 supports dynamic UL TX switching where the BS 506 is configured to switch between inter-band CA, some of which may belong to different TAGs. The ULTxSwitchingBandPair structure 540 may have a set of bandIndex identifier parameters 542 identifying bands on which the UE communicates. For example, the set of bandIndex identifier parameters 542 may include bandIndexUL1, bandIndexUL2, bandIndexUL3 . . . bandIndexULk, where k equals the total number of bands on which the UE may communicate. In addition, or alternatively, the UE may be configured to set a bandIndex identifier parameter 542 to indicate a band pair on which the UE 502 supports dynamic UL TX switching. The UE may set each bandIndex identifier parameter 542 to be an identifier of a band, such as a band entry in a band combination. The UE 502 may be configured to provide other information about a bandIndex identifier parameter 542 as part of the ULTxSwitchingBandPair structure 540, such as an associated parameter that indicates the presence or absence of support for 2-layer UL MIMO capabilities. A device analysing such data may filter out as potential destinations (i.e., CC for the UE 502 to switch to) bands that do not support 2-layer UL MIMO. Another possible bandIndex identifier parameter 542 may be a location of a base station for a band on which the UE may communicate.

The ULTxSwitchingBandPair structure 540 may have an uplinkTxSwitchingPeriod parameter 544 that may be set to indicate a length of a UL TX switching period per pair of UL bands per band combination when dynamic UL TX switching is configured. The uplinkTxSwitchingPeriod parameter 544 may include a time period for a TA of a CC when the UE 502 transmits data on the CC, such as the TA of CC1 of the BS 504. The UE may be configured to set a static value for this parameter based upon a standard used by a BS or CC, such as 35 μs or 140 μs.

The ULTxSwitchingBandPair structure 540 may have a noncollocatedCASwitchingPeriod parameter 546 that may be set to indicate an additional switching period delay that is added when band pairs belong to different TAG groups. For example, where the UE 502 is configured to switch from transmitting data on CC1 of BS 504 transmitting data on CC2 of BS 506, the UE may set the noncollocatedCASwitchingPeriod to be the difference between the TA of CC1 and the TA of CC2 when the TA of CC1 is greater than the TA of CC2. Where the UE 502 is configured to switch from transmitting data on CC1 of BS 504 to transmitting data on CC2 of BS 506, the UE may set the noncollocatedCASwitchingPeriod to be zero when the TA of CC1 is less than the TA of CC2.

The ULTxSwitchingBandPair structure 540 may have other parameters that may be useful to transmit to BS 504 depending upon need. For example, the ULTxSwitchingBandPair structure 540 may have an uplinkTxSwitching-DL-Interruption parameter that may be used to indicate whether DL interruption on a band may occur UL Tx switching. The UE 502 may be configured to not set this field for a band combination of SUL band+TDD band. Such a field may be encoded as a bit map. For example, a bit N may be set to “1” where the UE determines that DL interruption on band N will occur during uplink TX switching. The UE may set the leading/leftmost bit (bit 0) to correspond to a first band of the band combination, the next bit to corresponds to the second band of this band combination and so on and so forth until all bands of the band combination are accounted for. The UE may be configured to not set the uplinkTxSwitching-DL-Interruption parameter for the band combinations TDD+TDD CA with the same UL-DL pattern or TDD+TDD EN-DC with the same UL-DL pattern, as DL reception interruption may not be enabled fur such band combinations.

The UE 502 may alternatively or additionally provide the UE capability information 508 as a set of values for one or more of the parameters or variables for a CABandPair structure 550. The CABandPair structure 550 may be used for configurations where the UE 502 is capable of transmitting data to non-collocated CA. Similar to the ULTxSwitchingBandPair structure 540, the CABandPair structure 550 may have a set of bandIndex identifier parameters 552 similar to the set of bandIndex identifier parameters 542 of the ULTxSwitchingBandPair structure 540.

The CABandPair structure 550 may have a maxallowedTAoffset parameter 554 that may be set by the UE 502 to indicate a length of maximum allowed TA offset among TAGs. In other words, when a UE switches from communicating on a first carrier to communicating on a second carrier, the maxallowedTAoffset parameter 554 may limit the amount of delay added to the UE’s 2*TA value when a device (e.g., the UE 502, the BS 504, or the BS 506) calculates a switching period. For example, the UE 502 may set the maxallowedTAoffset parameter 554 to be a maximum difference between any two different TAGs, or may set the maxallowedTAoffset to be a whole number above the maximum difference between any two TAGs, or may set the maxallowedTAoffset to be a number in a designated lookup table that is above the maximum difference between any two TAGs. The UE 502 or the BS 504, or another related device, may use the maxallowedTAoffset parameter 554 to configure a switching period for the UE 502 where a device has determined that it may be too difficult or time-consuming to accurately calculate a switching period for the UE 502. For example, the BS 504 may receive a set of bandIndex identifier parameters 542, and determine that one bandIndex identifier parameter corresponds with CC2. However, the BS 504 may be unable to contact BS 506 to determine a TA of BS 506 with respect to the UE 502. In such a situation, the UE 502 may be configured to utilize the maxallowedTAoffset parameter 554 to set its switching period when switching from CC1 to CC2, to ensure that no data is lost during the switch.

After the UE 502 transmits UE capability information 508 to the BS 504, such as information associated with a CA switching period for the second carrier CC2 547 or information indicating the set of bands associated with CA bands of at least the second carrier CC2 553, the UE 502 may switch from communicating on the CC1 of the BS 504 to communicating on the CC2 of the BS 506. The CA switching period may be used by the UE 502 to switch from communicating on the first carrier CC1 associated with a first TA of a first TAG to communicating on the second carrier CC2 associated with a second TA of a second TAG 510. Such a CA switching period may be useful where the first TAG and the second TAG are different, and the first TA is greater than the second TA. The UE 502 may then communicate with the BS 506 on the second carrier CC2 based on the UE capability information 508 via the transmission 514. The BS 504 may utilize some of the UE capability information 508 to communicate with the BS 506, for example the CA switching period.

One or both the network and the UE may be configured to expect a longer interruption time when switching between bands that have different TAGs. As such, a longer switch time may be configured using RRC signaling. For example, the UE 502 may receive, through RRC, signaling from BS 504. The RRC signaling may include information indicating the CA switching period for the second carrier CC2 547. The information indicating the CA switching period may be based on the information indicating the set of bands associated with the CA bands of the at least one second carrier CC2 553.

Where the UE reports the ULTxSwitchingBandPair structure 540 to the BS 504, a device of the network (e.g. BS 504 or BS 506) may configure a new switching period based on the reported values of the ULTxSwitchingBandPair structure 540. For example, a device may calculate a new CA switching period by adding the value of uplinkTxSwitchingPeriod to the value of noncollocatedCASwitchingPeriod. In addition to transmitting the ULTxSwitchingBandPair structure 540, or alternatively to transmitting the ULTxSwitchingBandPair structure 540, the UE may transmit the CABandPair structure 550 to the BS 504. The network may then configure an experience value based on the band combination. For example, a device may use the set of bandIndex identifier parameters 552 to determine a location of each band to calculate estimated TA values between the UE 502 and the carriers of the set of bands. The estimated TA values may then be used to estimate a maximum offset of propagation between gNBs over the air. Alternatively, a device may use the set of bandIndex identifier parameters 552 to determine frequencies used be each band to calculate estimated TA values between the UE 502 and the carriers of the set of bands. Likewise, the estimated TA values may then be used to estimate a maximum offset of propagation between the bands based on frequency.

Figure 6:
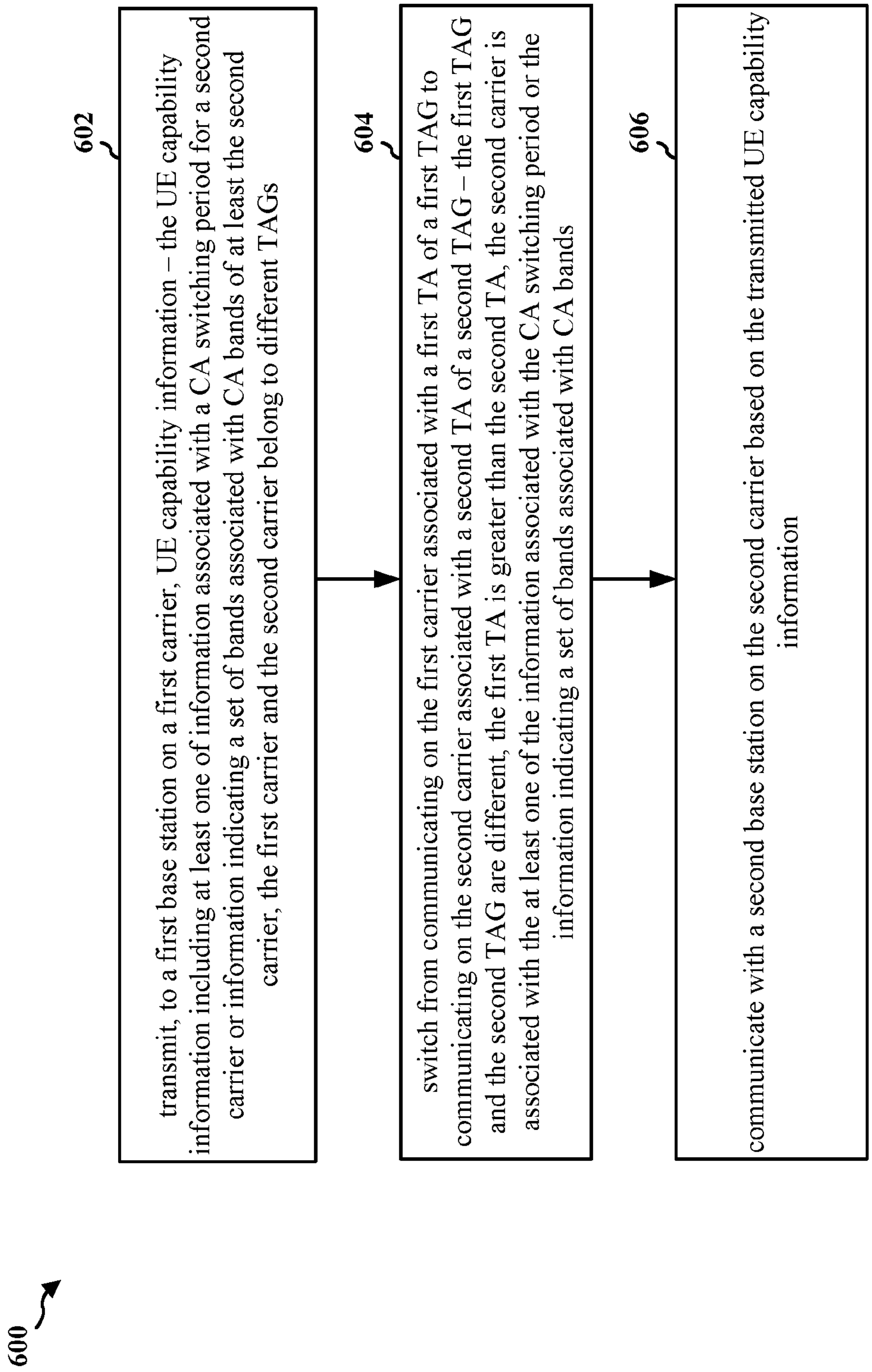
FIG. 6 is a flowchart of a method of wireless communication associated with a UE and two base stations.

FIG. 6 is a flowchart 600 of a method of wireless communication. The method may be performed by a UE (e.g., the UE 104; the apparatus 702). At 602, the UE may transmit, to a first base station on a first carrier, UE capability information. The UE capability information may include at least one of information associated with a CA switching period for a second carrier or information indicating a set of bands associated with CA bands of at least the second carrier. The first carrier and the second carrier may belong to different TAGs. For example, referring to FIG. 5, the UE 502 may transmit, to a first base station 504 on a first carrier CC1, UE capability information 508. The UE capability information 508 may include at least one of information associated with a CA switching period for a second carrier CC2 540 or information indicating a set of bands associated with CA bands of at least the second carrier CC2 550. Referring to FIG. 4, the first carrier CC1 401 and the second carrier CC2 may belong to different TAGs (i.e., CC1 401 has a TA of TA1 while CC2 402 has a TA of TA2).

At 604 the UE may switch from communicating on the first carrier associated with a first TA of a first TAG to communicating on the second carrier associated with a second TA of a second TAG. The first TAG and the second TAG may be different. The first TA may be greater than the second TA. The second carrier may be associated with the at least one of the information associated with the CA switching period or the information indicating a set of bands associated with CA bands. For example, referring to FIGS. 4 & 5, the UE 502 may switch from communicating on the first carrier CC1 associated with a first TA1 of a first TAG to communicating on the second carrier CC2 associated with a second TA2 of a second TAG. The first TAG may have TA values of TA1 and the second TAG may have TA values of TA2 that are different from one another. As shown in FIG. 4, the first TA1 may be greater than the second TA2. As shown in FIG. 5, the second carrier CC2 may be associated with the at least one of the information associated with the CA switching period for the second carrier CC2 547 or the information indicating a set of bands associated with CA bands of at least the second carrier CC2 553.

Finally, at 606 the UE may communicate with a second base station on the second carrier based on the transmitted UE capability information. For example, as shown in FIG. 5, the UE 502 may communicate with the BS 506 on the second carrier CC2 based on the UE capability information 508 via the transmission 514.

Figure 7:
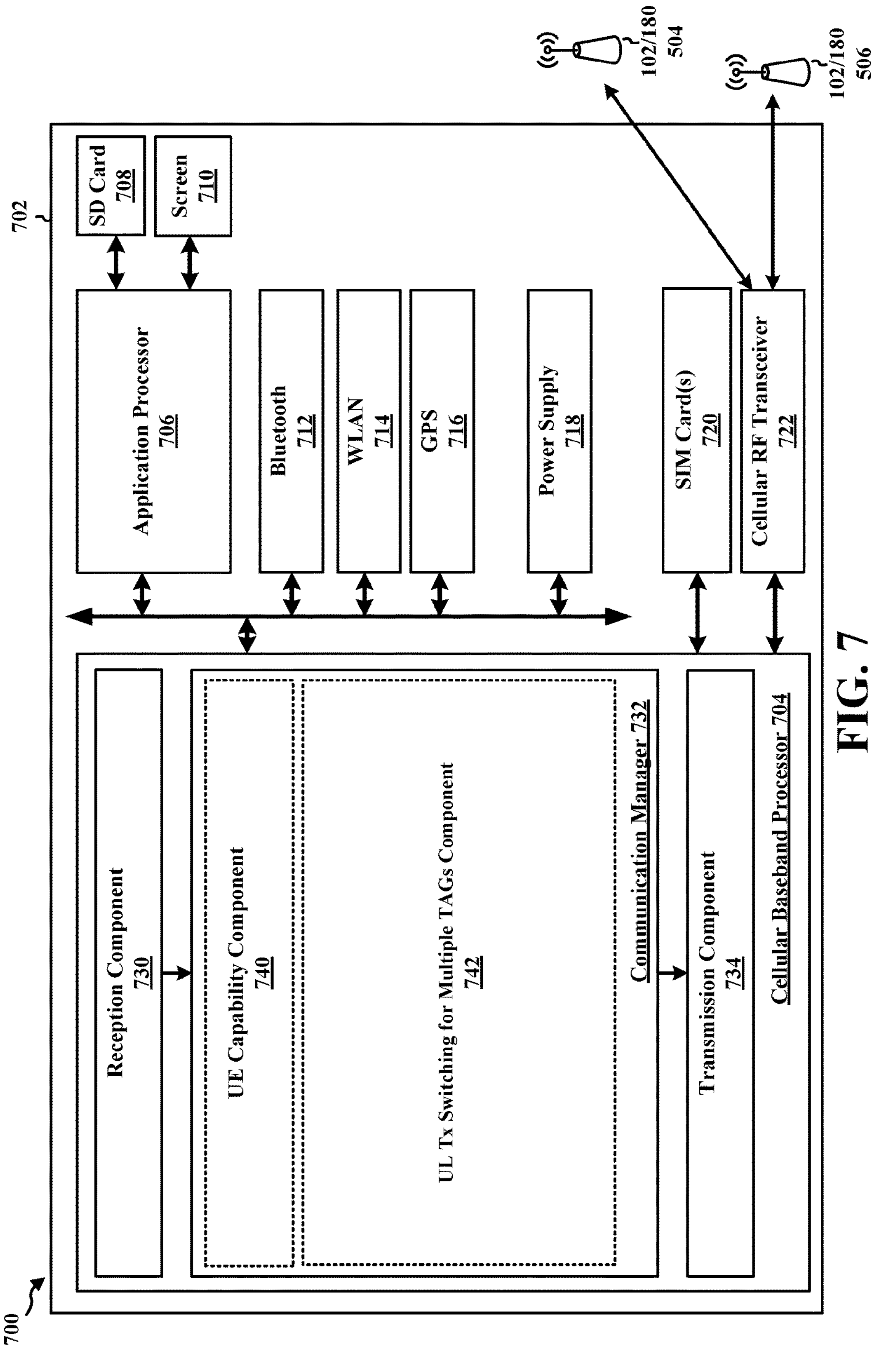
FIG. 7 is a diagram illustrating an example of a hardware implementation for an example apparatus.

FIG. 7 is a diagram 700 illustrating an example of a hardware implementation for an apparatus 702. The apparatus 702 may be a UE, a component of a UE, or may implement UE functionality. In some aspects, the apparatus 702 may include a cellular baseband processor 704 (also referred to as a modem) coupled to a cellular RF transceiver 722. In some aspects, the apparatus 702 may further include one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, or a power supply 718. The cellular baseband processor 704 communicates through the cellular RF transceiver 722 with the UE 104 and/or BS 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the additional modules of the apparatus 702.

The communication manager 732 includes a UE capability component 740 that is configured to transmit UE capability information to first a base station on a first carrier, e.g., as described in connection with 602 of FIG. 6. The communication manager 732 may further include a UL TX switching for multiple TAGs component 742 that receives input in the form of an updated switching period from the component 740 and is configured to dynamically change the switching period of the UE when the UE switches from transmitting on a first CC to transmitting on a second CC, e.g., as described in connection with step 604 of FIG. 6.

The apparatus may include additional components that perform each of the blocks of the algorithm in the flowcharts of FIG. 6. As such, each block in the flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 702 may include a variety of components configured for various functions. In one configuration, the apparatus 702, and in particular the cellular baseband processor 704, includes means for transmitting UE capability information to a first base station on a first carrier. The UE capability information may include at least one of information associated with a CA switching period for a second carrier or information indicating a set of bands associated with CA bands of at least the second carrier. The first carrier and the second carrier may belong to different TAGs. The apparatus 702, and in particular the cellular baseband processor 704, may also include a means for switching from communicating on the first carrier associated with a first TA of a first TAG to communicating on the second carrier associated with a second TA of a second TAG. The first TAG and the second TAG may be different. The first TA may be greater than the second TA. The second carrier may be associated with the at least one of the information associated with the CA switching period for the second carrier or the information indicating the set of bands associated with the CA bands of at least the second carrier. The apparatus 702, and in particular the cellular baseband processor 704, may also include a means for communicating with a second base station on the second carrier based on the transmitted UE capability information. The means may be one or more of the components of the apparatus 702 configured to perform the functions recited by the means. As described supra, the apparatus 702 may include the TX Processor 368, the RX Processor 356, and the controller/processor 359. As such, in one configuration, the means may be the TX Processor 368, the RX Processor 356, and the controller/processor 359 configured to perform the functions recited by the means.

A UE configured to transmit UE capability information regarding information associated with a CA switching period for a destination carrier or information related to a set of bands associated with CA bands of at least the destination carrier creates infrastructure that may be utilized to dynamically change the UE's switching period if the switching period needs to be changed. Lengthening such switching periods may prevent data loss for a UE or a base station that has a longer switching period than expected. Shortening such switching periods may decrease latency and downtime. Where the TA for the first CC is greater than the TA for the second CC, the switching period may be lengthened by a difference between the first and second CCs to prevent possible data loss when switching from the first CC to the second CC. A TA may vary from carrier to carrier where carriers are non-collocated and/or where carriers are transmitted using different frequencies. By generating infrastructure that allows UEs to transmit relevant UE capability information in a variety of ways (e.g. by transmitting a ULTxSwitchingBandPair 540 structure or a CABandPair 550 structure shown in FIG. 5), the UE and/or base stations may be able to accurately and efficiently calculate proper CA switching periods for carriers belonging to different TAGs in a variety of ways (e.g., by adding a CASwitchingPeriod delay, by adding a maxallowedTAoffset delay, by adding an estimated offset delay).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is method of wireless communication at a UE, including transmitting UE capability information to a first base station. The UE capability information include at least one of information associated with a CA switching period for a second carrier or information indicating a set of bands associated with CA bands of at least the second carrier. The first carrier and the second carrier belong to different TAGs. The method of wireless communication at the UE further includes switching from communicating on the first carrier associated with a first TA of a first TAG to communicating on the second carrier associated with a second TA of a second TAG. The first TAG and the second TAG are different. The first TA is greater than the second TA. The second carrier is associated with the at least one of the information associated with the CA switching period for the second carrier or the information indicating the set of bands associated with the CA bands of at least the second carrier. The method of wireless communication at the UE further includes communicating with a second base station on the second carrier based on the transmitted UE capability information.

Aspect 2 is the method of aspect 1, wherein the at least one processor is further configured to receive, in downlink from the second base station, scheduling for communicating with the second base station based on the transmitted UE capability information.

Aspect 3 is the method of any of aspects 1 and 2, wherein the UE capability information comprises an uplink transmission switching band pair information element (IE) that includes the information associated with the CA switching period for the second carrier.

Aspect 4 is the method of aspect 3, wherein the information associated with the CA switching period for the second carrier comprises an offset, the offset being a difference between a first switching period associated with the first TAG and a second switching period.

Aspect 5 is the method of aspect 4, wherein the second switching period is greater than the first switching period.

Aspect 6 is the method of any of aspects 4 and 5, wherein the offset is a maximum offset between two different Tas.

Aspect 7 is the method of any of aspects 4 to 6, wherein the second switching period is associated with a second TAG.

Aspect 8 is the method of any of aspects 3 and 4, wherein the uplink transmission switching band pair IE further comprises a set of band indexes.

Aspect 9 is the method of aspect 8, wherein the set of band indexes comprises at least three band indexes, and at least a third band index of the set of band indexes is associated with the information associated with the CA switching period for the second carrier.

Aspect 10 is the method of any of aspects 1 to 9, wherein the UE capability information comprises a CA band pair information element (IE) that includes the information indicating the set of bands associated with the CA bands of at least the second carrier.

Aspect 11 is the method of aspect 10, wherein the CA band pair IE further includes a maximum allowed TA offset associated with a maximum allowed difference between the first TA and the second TA.

Aspect 12 is the method of any of aspects 10 and 11, wherein the method further includes receiving, through radio resource control (RRC) signaling from the first base station, information indicating the CA switching period for the second carrier, the information indicating the CA switching period being based on the information indicating the set of bands associated with the CA bands of at least the second carrier.

Aspect 13 is the method of any of aspects 1 to 12, wherein the first base station and the second base station are different.

Aspect 14 is the method of any of aspects 1 to 13, wherein the first base station and the second base station are a same base station.

Aspect 15 is the method of any of aspects 1 to 14, wherein the CA bands are non-collocated CA bands.

Aspect 16 is the method of any of aspects 1 to 15, wherein the CA switching period is a non-collocated CA switching period.

Aspect 17 is the method of any of aspects 1 to 16, further comprising a transceiver coupled to the at least one processor.

Aspect 18 is an apparatus for wireless communication at a UE, including a memory and at least one processor coupled to the memory and configured to implement any of aspects 1 to 17.

Aspect 19 is an apparatus for wireless communication including means for implementing any of aspects 1 to 17.

Aspect 20 is a computer-readable medium storing computer executable code, where the code when executed by a processor causes the processor to implement any of aspects 1 to 17.

What is claimed is:

1. An apparatus for wireless communication at a user equipment (UE), comprising:
- memory; and
- at least one processor coupled to the memory and configured to:
  - transmit, to a first base station on a first carrier, UE capability information, the UE capability information comprising information associated with a carrier aggregation (CA) timing advance group (TAG) switching period for a second TAG, the first carrier belonging to a first timing advance group (TAG) associated with a first timing advance (TA), a second carrier belonging to the second TAG associated with a second TA, the first TA and the second TA being different;
  - switch from communicating on the first carrier to communicating on the second carrier based on the first TA for the first TAG and the information associated with the CA TAG switching period for the second TAG; and
  - communicate with a second base station on the second carrier after the switch from communicating on the first carrier to communicating on the second carrier.

2. The apparatus of claim 1, wherein the at least one processor is further configured to:
- receive, in downlink from the second base station, scheduling for communicating with the second base station, wherein, to communicate with the second base station on the second carrier, the at least one processor is configured to:
  - communicate with the second base station on the second carrier based on the received scheduling.

3. The apparatus of claim 1, wherein the UE capability information comprises an uplink transmission switching band pair information element (IE) comprising the information associated with the CA TAG switching period for the second carrier.

4. The apparatus of claim 3, wherein the information associated with the CA TAG switching period for the second carrier comprises an offset, the offset being a difference between a first switching period associated with the first TAG and a second switching period, wherein, to switch from communicating on the first carrier to communicating on the second carrier based on the first TA for the first TAG and the CA TAG switching period for the second TAG, the at least one processor is configured to:
- switch from communicating on the first carrier to communicating on the second carrier based on the first TA for the first TAG and the offset.

5. The apparatus of claim 4, wherein the second switching period is greater than the first switching period.

6. The apparatus of claim 1, wherein the information associated with the CA switching period for the second carrier comprises a maximum offset between the first TA and the second TA, wherein, to switch from communicating on the first carrier to communicating on the second carrier based on the first TA for the first TAG and the CA TAG switching period for the second TAG, the at least one processor is configured to:
- switch from communicating on the first carrier to communicating on the second carrier based on the first TA for the first TAG and the maximum offset between the first TA and the second TA.

7. The apparatus of claim 4, wherein the second switching period is associated with the second TAG.

8. The apparatus of claim 3, wherein the uplink transmission switching band pair IE further comprises a set of band indexes.

9. The apparatus of claim 8, wherein the set of band indexes comprises at least three band indexes, and at least a third band index of the set of band indexes is associated with the information associated with the CA switching period for the second carrier.

10. The apparatus of claim 1, wherein the UE capability information comprises a CA band pair information element (IE) that includes information indicating a set of bands associated with CA bands of at least the second carrier.

11. The apparatus of claim 10, wherein the CA band pair IE further includes a maximum allowed TA offset associated with a maximum allowed difference between the first TA and the second TA, wherein, to switch from communicating on the first carrier to communicating on the second carrier based on the first TA for the first TAG and the CA TAG switching period for the second TAG, the at least one processor is configured to:

switch from communicating on the first carrier to communicating on the second carrier based on the first TA for the first TAG and the maximum allowed TA offset between the first TA and the second TA.

12. The apparatus of claim 10, wherein the at least one processor is further configured to:

receive, through radio resource control (RRC) signaling from the first base station, information indicating the CA switching period for the second carrier, the information indicating the CA switching period being based on the information indicating the set of bands associated with the CA bands of at least the second carrier.

13. The apparatus of claim 1, wherein the first base station and the second base station are different.

14. The apparatus of claim 1, wherein the first base station and the second base station are a same base station.

15. The apparatus of claim 1, wherein a first CA band of the first carrier and a second CA band of the second carrier are non-collocated CA bands.

16. The apparatus of claim 1, wherein the CA TAG switching period comprises a non-collocated CA switching period.

17. The apparatus of claim 1, further comprising a transceiver coupled to the at least one processor, wherein the at least one processor is further configured to:

transmit the UE capability information via the transceiver; and communicate with the second base station via the transceiver.

18. A method of wireless communication at a UE, comprising:

transmitting, to a first base station on a first carrier, UE capability information, the UE capability information comprising information associated with a carrier aggregation (CA) timing advance group (TAG) switching period for a second TAG, the first carrier belonging to a first timing advance group (TAG) associated with a first timing advance (TA), a second carrier belonging to the second TAG associated with a second TA, the first TA and the second TA being different;

switching from communicating on the first carrier to communicating on the second carrier based on the first TA for the first TAG and the information associated with the CA TAG switching period for the second TAG; and communicating with a second base station on the second carrier after the switch from communicating on the first carrier to communicating on the second carrier.

19. The method of claim 18, further comprising:

receiving, in downlink from the second base station, scheduling for communicating with the second base station, wherein communicating with the second base station on the second carrier comprises:

communicating with the second base station on the second carrier based on the received scheduling.

20. The method of claim 18, wherein the UE capability information comprises an uplink transmission switching band pair information element (IE) comprising the information associated with the CA TAG switching period for the second carrier.

21. The method of claim 20, wherein the information associated with the CA TAG switching period for the second carrier comprises an offset, the offset being a difference between a first switching period associated with the first TAG and a second switching period, wherein switching from communicating on the first carrier to communicating on the second carrier based on the first TA for the first TAG and the CA TAG switching period for the second TAG comprises:

switching from communicating on the first carrier to communicating on the second carrier based on the first TA for the first TAG and the offset.

22. The method of claim 21, wherein the second switching period is greater than the first switching period.

23. The method of claim 18, wherein the information associated with the CA TAG switching period for the second carrier comprises a maximum offset between the first TA and the second TA, wherein switching from communicating on the first carrier to communicating on the second carrier based on the first TA for the first TAG and the CA TAG switching period for the second TAG comprises:

switching from communicating on the first carrier to communicating on the second carrier based on the first TA for the first TAG and the maximum offset between the first TA and the second TA.

24. The method of claim 21, wherein the second switching period is associated with the second TAG.

25. The method of claim 20, wherein the uplink transmission switching band pair IE further comprises a set of band indexes.

26. The method of claim 25, wherein the set of band indexes comprises at least three band indexes, and at least a third band index of the set of band indexes is associated with the information associated with the CA TAG switching period for the second carrier.

27. The method of claim 18, wherein the UE capability information comprises a CA band pair information element (IE) that includes:

the information indicating a set of bands associated with CA bands of at least the second carrier; and a maximum allowed TA offset associated with a maximum allowed difference between the first TA and the second TA.

28. An apparatus for wireless communication at a UE, comprising:

means for transmitting, to a first base station on a first carrier, UE capability information, the UE capability information comprising information associated with a carrier aggregation (CA) timing advance group (TAG) switching period for a second TAG, the first carrier belonging to a first timing advance group (TAG) associated with a first timing advance (TA), a second carrier belonging to the second TAG associated with a second TA, the first TA and the second TA being different;

means for switching from communicating on the first carrier to communicating on the second carrier based on the first TA for the first TAG and the information associated with the CA TAG switching period for the second TAG; and means for communicating with a second base station on the second carrier after the switch from communicating on the first carrier to communicating on the second carrier.

29. A non-transitory computer-readable medium storing computer executable code at a UE, the code when executed by a processor causes the processor to:

transmit, to a first base station on a first carrier, UE capability information, the UE capability information comprising information associated with a carrier aggregation (CA) timing advance group (TAG) switching period for a second TAG, the first carrier belonging to a first timing advance group (TAG) associated with a first timing advance (TA), a second carrier belonging to the second TAG associated with a second TA, the first TA and the second TA being different;

switch from communicating on the first carrier to communicating on the second carrier based on the first TA for the first TAG and the information associated with the CA TAG switching period for the second TAG; and communicate with a second base station on the second carrier after the switch from communicating on the first carrier to communicating on the second carrier.

30. The apparatus of claim 1, wherein the at least one processor coupled to the memory is further configured to:

determine the CA TAG switching period for the second TAG based on a first calculation of the first TA and a time delay;

determine a second CA TAG switching period for the first TAG based on a second calculation of the second TA; and switch from communicating on the second carrier to communicating on the first carrier based on the determined second CA TAG switching period for the first TAG, wherein, to switch from communicating on the first carrier to communicating on the second carrier, the at least one processor is configured to:

switch from communicating on the first carrier to communicating on the second carrier further based on the determined CA TAG switching period for the second TAG.

* * * * *